United States Patent
Summa et al.

(10) Patent No.: US 6,330,952 B2
(45) Date of Patent: Dec. 18, 2001

(54) SHOCK ABSORBING TOW BAR FOR TROLLEY-TYPE CONVEYOR SYSTEMS

(75) Inventors: Gareth D. Summa, Denver; N. Duane Smith, Kansas City, both of MO (US)

(73) Assignee: Conveyor Technology Group Inc., Kansas City, MO (US)

( * ) Notice: Subject to any disclaimer, the term of this patent is extended or adjusted under 35 U.S.C. 154(b) by 0 days.

(21) Appl. No.: 09/681,976

(22) Filed: Jul. 2, 2001

Related U.S. Application Data (62) Division of application No. 09/832,400, filed on Apr. 11, 2001, which is a continuation of application No. 09/404,899, filed on Sep. 24, 1999, now Pat. No. 6,244,451.

(51) Int. Cl.[7] ..................................................... B61B 12/00
(52) U.S. Cl. ..................................... 213/62 R; 104/172.3; 188/74; 267/196
(58) Field of Search ................................... 213/62 R, 63, 213/64, 66, 67 A; 267/196, 205, 206, 207, 208, 134; 104/172.1, 172.2, 172.3, 172.4; 188/67, 68, 70 R, 74, 75, 335, 336

(56) References Cited

U.S. PATENT DOCUMENTS

| | | | | |
|---|---|---|---|---|
| 1,089,830 | * | 3/1914 | Frommater | 267/206 |
| 1,309,490 | * | 7/1919 | Stanley | 267/206 |
| 2,856,179 | * | 10/1958 | Hogan | 267/206 |
| 3,796,288 | * | 3/1974 | Hollnagel | 188/129 |
| 5,511,486 | * | 4/1996 | Pollard et al. | 104/172.3 |

\* cited by examiner

*Primary Examiner*—Mark T. Le
(74) *Attorney, Agent, or Firm*—Hovey, Williams, Timmons & Collins (57) ABSTRACT

A shock absorbing tow bar for connection between the accumulating trolley and load carriage of a power and free conveyor system is disclosed. The tow bar includes one component that is connectable to the accumulating trolley and another that is connectable to the intermediate trolley of the load carriage. Limited relative shifting is permitted between the components of the tow bar. Moreover, the components are threadably intercoupled so that such relative shifting requires a screwing or unscrewing action that serves to cushion movement between the accumulating trolley and load carriage.

54 Claims, 3 Drawing Sheets

SHOCK ABSORBING TOW BAR FOR TROLLEY-TYPE CONVEYOR SYSTEMS

CROSS REFERENCE TO RELATED APPLICATIONS

This is a divisional application of Ser. No. 09/832,400; Filed Apr. 11, 2001, which is a continuation application of U.S. Ser. No. 09/404,899; Filed on Sep. 24, 1999, now U.S. Pat. No. 6,244,451, which are incorporated by reference herein.

BACKGROUND OF INVENTION

1. Field of the Invention

The present invention relates generally to cushioning devices, such as shock absorbers, for cushioning movement between two relatively moveable structures. More specifically, the present invention concerns a cushioning device that is particularly suitable for use as a tow bar in a trolley-type conveyor system (e.g., a power and free conveyor system).

2. Discussion of Prior Art

A moving structure is likely to experience shock (e.g., sudden acceleration or deceleration), and it is often desirable to absorb and cushion the shock so that untoward loading and consequential wear or damage of the structure is avoided. Accordingly, movement of the structure is often cushioned relative to some other structure. This is typically accomplished by providing a cushioning device between the two structures. However, traditional cushioning devices present numerous problems.

These problems are particularly evident in conveyor systems having a series of load carriers that are routinely stopped along the length of the conveyor system. It will be appreciated that such conveyor systems are often used in assembly lines and stoppage of the load carriers permits various steps to be performed at assembly stations spaced along the conveyor line. Furthermore, the carriers will often support large, heavy items (e.g., an automobile) and stoppage of the carriers must account for the momentum of not only the carrier but also the item supported thereon. It is also noted that starting and stopping of the load carrier at each of the stations is typically sudden so as to provide, among other things, less travel time between stations.

One example of such a conveyor system involves a so-called "power and free conveyor system", wherein a power track provides power to the conveyor system and the free track carries the loads and is selectively coupled to the power track for moving the loads along the conveyor path. The free track traditionally includes a load carrier comprising a drive unit that is selectively connected to the power track, a load-supporting unit for supporting an item, and a tow bar interconnecting the units. Traditionally, the drive unit is simultaneously disconnected from the power track and stopped, which consequently requires the load-supporting unit and the item supported thereon to suddenly decelerate. It is important that this shock be absorbed so that damage to the conveyor system and item is avoided. It is also important that the absorbed energy is not stored (e.g., as would normally be the case when a spring is used to absorb the energy); otherwise, the stored energy will likely cause the carrier to lunge forwardly which can be damaging to the conveyor components and supported item and dangerous.

The tow bar used in a traditional power and free conveyor system consequently includes structure that attempts to absorb the shock loads between the drive unit and the load-supporting unit. However, it is believed that conventional tow bars are simply incapable of effectively diffusing the shock loads between the drive and load-supporting units. Moreover, conventional tow bars often have complex and/or expensive constructions and fail to provide the durability needed in most conveyor system environments. Furthermore, a tow bar is preferably adjustable so that the various ranges of shock loads can be accommodated; that is to say, a tow bar preferably permits user adjustment of the amount of resistance it provides to relative movement between the drive and load-supporting units. It will be appreciated that such adjustability permits the tow bar to be used with various load sizes (i.e., the tow bar can be used with variously sized items carried on the load-supporting unit). However, it is also believed that most conventional tow bars designed to permit adjustment of the shock absorption, in fact, provide little, if any, effective adjustability.

OBJECTS AND SUMMARY OF THE INVENTION

Responsive to these and other problems, an important object of the present invention is to provide an improved cushioning device that overcomes the problems associated with the prior art. Another important object of the present invention is to provide a cushioning device that is particularly effective as a shock absorbing tow bar in a conveyor system. In this respect, an important object of the present invention to provide a tow bar having an inexpensive, simple and durable construction. It is also an important object of the present invention to provide a shock absorbing tow bar that is highly adjustable so that it may be used in various applications.

In accordance with these and other objects evident from the following description of the preferred embodiment, the present invention concerns a cushioning device that includes a pair of shiftably interconnected components. As a shock absorbing tow bar, one of the components is connected to the drive unit of the load carrier and the other is connected to the load. supporting unit. Moreover, the components are threadably intercoupled so that relative shifting of the components requires a screwing or unscrewing action that serves to cushion movement between the drive unit and load-supporting unit.

Other aspects and advantages of the present invention will be apparent from the following detailed description of the preferred embodiment and the accompanying drawing figures.

BRIEF DESCRIPTION OF DRAWINGS

A preferred embodiment of the invention is described in detail below with reference to the attached drawing figures, wherein.

DETAILED DESCRIPTION OF THE PREFERRED EMBODIMENT

Figures 1, 2:
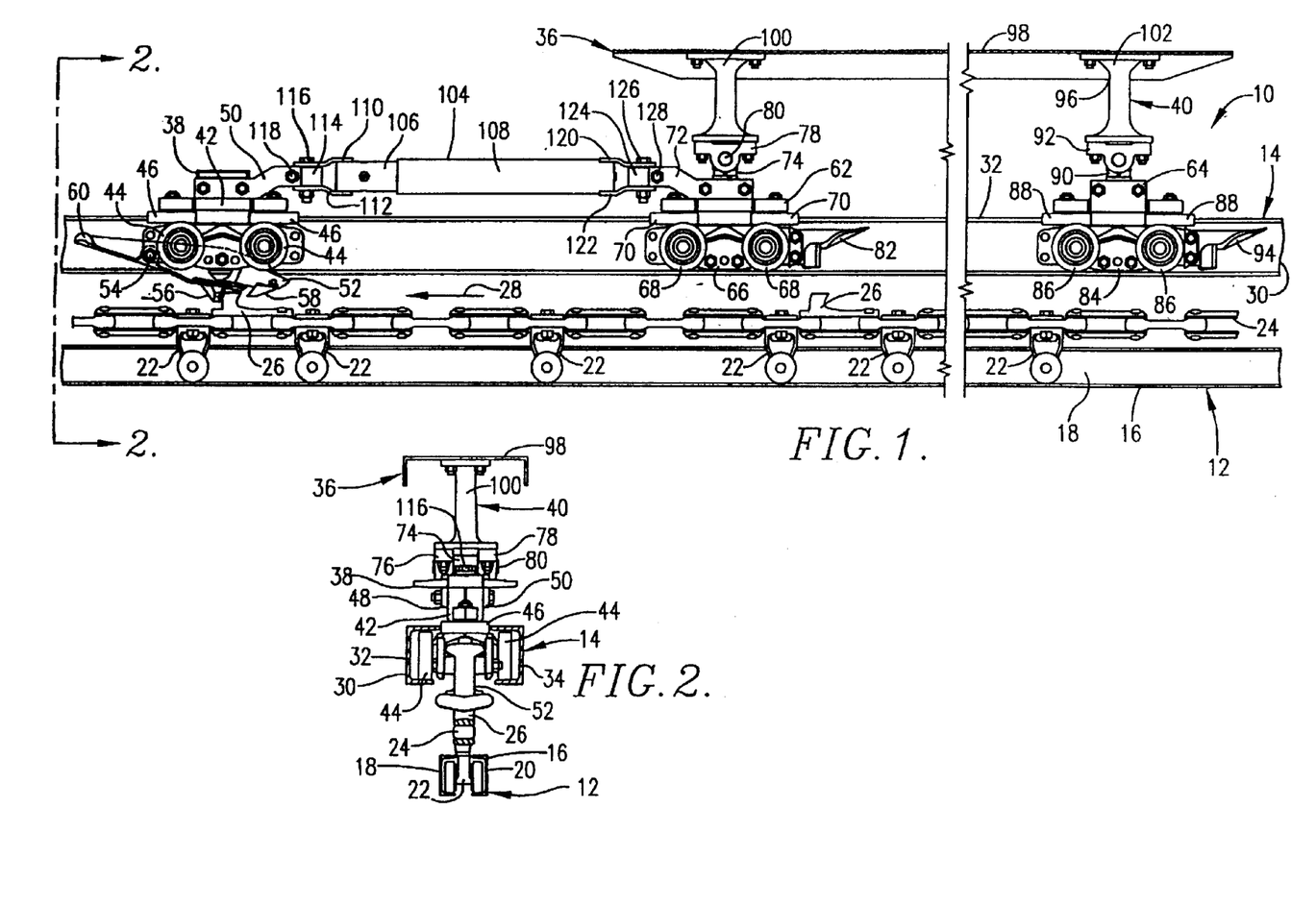
FIG. 1 is a fragmentary vertical sectional view of a power and free conveyor system including a load carrier that is provided with a shock absorbing tow bar constructed in accordance with the principles of the present invention.
FIG. 2 is a vertical sectional view taken along line 2—2 of FIG. 1.

Turning initially to FIGS. 1 and 2, the conveyor system 10 selected for illustration generally includes a power track 12 and an upwardly spaced free track 14. The power track 12 provides power to the conveyor system 10, while the free track 14 carries the loads and is selectively coupled to the power track 20 for moving the loads along the conveyor path. In this respect, the illustrated embodiment comprises a so-called power and free conveyor system. However, the principles of the present invention are equally applicable to various other conveyor systems and additional applications. For example, the principles of the present invention may be utilized in an overhead power and free system, in a tilt table to cushion shock loads exerted against the table, etc.

With the foregoing caveat in mind, the illustrated conveyor system 10 has a generally standard construction except for those inventive features described hereinbelow. It shall therefore be sufficient to explain that the power track 12 includes a rail 16 defined by two opposed, spaced apart C-shaped channels 18 and 20 (see FIG. 2). A plurality of spaced apart, wheeled power trolleys 22 ride along the length of the power rail 16. The power trolleys 22 cooperatively carry an endless drive chain 24 above the rail 16, and the chain is provided with a plurality of spaced apart pusher dogs 26. In the usual manner, a suitable power source, such as a motor (not shown), is provided to propel the trolleys 22 and chain 24 along the rail 16. In the illustrated embodiment, the trolleys 22 and chain 24 are driven leftwardly as depicted by arrow 28. During operation, the power track 12 continuously runs so that driving power for the free track 14 is always available.

The free track 14 similarly includes a rail 30 defined by two opposed, spaced apart C-shaped channels 32 and 34 (see FIG. 2). However, the free track 14 includes a plurality of similarly constructed load carriers 36 (only one being shown in FIGS. 1 and 2), each of which supports and moves an item (not shown) along the length of the conveyor system 10. Generally speaking, the carrier 36 includes an accumulating trolley 38 and a load carriage 40 connected in a trailing relationship to the accumulating trolley 38. As will subsequently be described, the accumulating trolley 38 is configured to be selectively coupled to the drive chain 24 for moving the carrier 36 along the length of the conveyor system 10, and the load carriage 40 is designed to support an item (not shown) thereon.

The accumulating trolley 38 includes a body 42 supported by load wheels 44 (only three being shown in FIGS. 1 and 2) which ride in respective ones of the channels 18 and 20. A pair of guide rollers 46 are mounted to the body 42 for rotation about respective axes that are perpendicular to the rotational axes of the load wheels 44. As perhaps best shown in FIG. 2, the guide rollers 46 are aligned with the upper flanges of the channels 18 and 20 to maintain the proper lateral orientation of the body 42 within the rail 16. A pair of attachment straps 48 and 50 project rearwardly from the body 42 for purposes which will subsequently be described. The trolley 38 further includes a stop mechanism 52 swingably mounted to the body 42 at pivot 54. Adjacent the rear end of the mechanism 52 is a pair of spaced apart, downwardly projecting lugs 56 and 58 defining a space therebetween which is configured to receive the pusher dog 26 therein, as shown in FIG. 1. It will be appreciated that the stop mechanism 52 is shown in an engaged position in FIG. 1, wherein the pusher dog 26 is received between the lugs 56,58 and engages the forward lug 56 to drive the accumulating trolley 38 along the rail 30. The rearward lug 58 is provided to prevent forward movement of the trolley 38 beyond the pusher dog 26, which is particularly useful in maintaining the interengagement of the stop mechanism 52 and pusher dog 26 when the rails 16,30 slope downwardly. As noted, it is normal to routinely stop the load carrier 36 and the stop mechanism 52 must consequently be disengeable from the pusher dog 26. This is accomplished simply by swinging the mechanism 52 in a counterclockwise direction (when viewing FIG. 1) to a disengaged position (not shown). In the disengaged position, the lugs 56,58 are swung out of engagement with the pusher dog 26. In the usual manner, the stop mechanism 52 is provided with a forwardmost engagement tab 60. When it is desired to stop the load carrier 36, a bracket (not shown).is simply positioned to engage the tab 60 and force it downwardly so that the stop mechanism 52 is swung to the disengaged position. The bracket also serves to hold the stop mechanism 52 and thereby check further forward movement of the carrier 36. As will be described below, each carrier 36 includes means for similarly swinging the stop mechanism of a trailing carrier to the disengaged position so that carriers which encounter a stopped carrier will also be stopped. It is also noted that the stop mechanism 52 is normally biased to the engaged position and is prevented from clockwise movement (when viewing FIG. 1) beyond the engaged position.

The load carriage 40 includes an intermediate trolley 62 and a trailing trolley 64 spaced from the intermediate trolley 62 in a rearward direction relative to the direction of travel (see arrow 28). The trolleys 62,64 are similar in construction to the accumulating trolley 38.

Particularly, the intermediate trolley 62 includes a body 66 supported by load wheels 68 (only two being shown in FIG. 1) and laterally oriented within the rail 30 by guide rollers 70. The trolley 72 also includes a pair of attachment straps 72 (only one being shown in FIG. 1) for purposes which will subsequently be described. However, the intermediate trolley 62 differs from the accumulating trolley 38 because the former does not include a stop mechanism. Furthermore, the intermediate trolley 62 includes a load pin 74 projecting upwardly from body 66 and supported thereby for relative rotational movement about its longitudinal axis. A pair of pillow boxes 76,78 are supported on a horizontal pivot pin 80 fixed to the upper end of the load pin 74. A rearwardly projecting stop mechanism engagement bracket 82 is also provided on the intermediate trolley 62, although the bracket 82 is unnecessary and may be removed if desired.

The trailing trolley 64 is virtually identical in construction to the intermediate trolley 62, except for the fact that the trailing trolley 64 does not include forwardly projecting attachment straps. Thus it shall be sufficient to explain that the trailing trolley 64 includes a body 84 supported by load wheels 86 and laterally oriented by guide rollers 88. A load pin 90 projects upwardly from the body 84 and swingably supports a pair of pillow boxes 92 (only one being shown in FIG. 1). A stop bracket 94 projects rearwardly from the body 84 and defines the rearwardmost part of the carrier 36 within the rail 30. Contrary to the intermediate trolley 62, the stop bracket 94 of the trailing trolley 64 is operational and, more importantly, serves to stop the trailing load carrier (not shown) when the illustrated load carrier 36 is stopped.

Particularly, when the load carrier 36 shown in FIG. 1 is stopped, as described above, the trailing load carrier will continue forwardly until the stop mechanism of its accumulating trolley engages the bracket 94 of the illustrated trailing trolley 64, whereupon the trailing carrier will also be disengaged from the power track 12 and thereby stopped.

The load carriage 40 also includes a support table 96 that interconnects the intermediate and trailing trolleys 62 and 64 and is supported therebetween. The table 96 includes a top support plate 98 on which an item (not shown) may be supported. A pair of pedestals 100 and 102 are connected between the plate 98 and pillow boxes 76,78 and 92 of the respective trolleys 62 and 64. It will be appreciated that the rotatable movement of the load pins 74,90 and pillow boxes 76,78,92 accommodates for grades and turns along the conveyor path.

As noted above, forward movement of the carrier 36 is halted by swinging the stop mechanism 52 to the disengaged position and virtually simultaneous retention of the mechanism 52 against further forward movement. This requires extremely sudden deceleration of the load carriage 40 and any item(s) supported thereon, which can be damaging to the conveyor components and the supported item(s). The present invention particularly concerns a tow bar 104 that connects the load carriage 40 to the accumulating trolley 38 and serves to cushion movement therebetween. In other words, the tow bar 104 provides means for gradually decelerating the load carriage 40.

Figure 3:
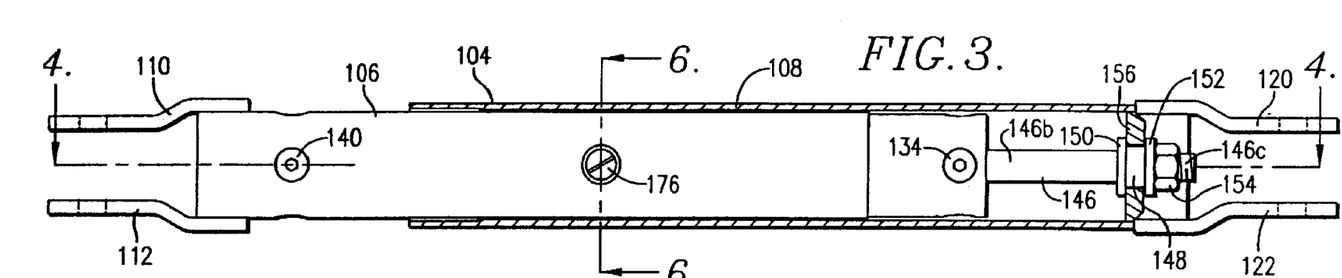
FIG. 3 is a sectional view of the shock absorbing tow bar, with the outer cylinder being sectioned to reveal the inner cylinder.
Figure 4:
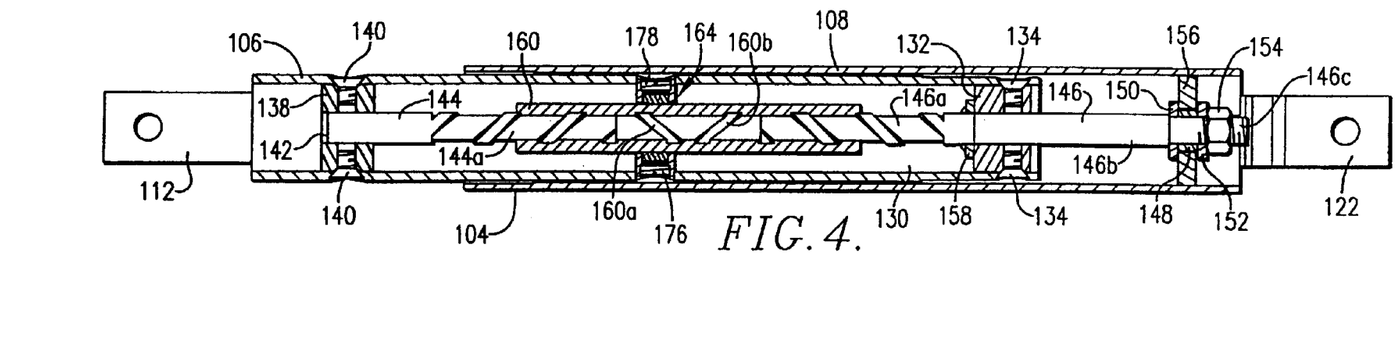
FIG. 4 is a cross-sectional view taken along line 4—4 of FIG. 3, particularly illustrating the tow bar in an extended condition.
Figure 5:
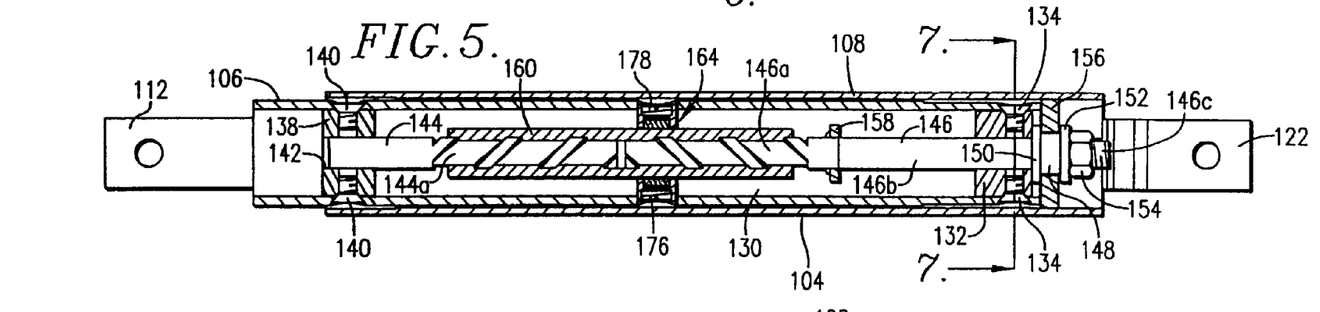
FIG. 5 is a cross-sectional view similar to FIG. 4, but illustrating the tow bar in a retracted condition.
Figure 8:
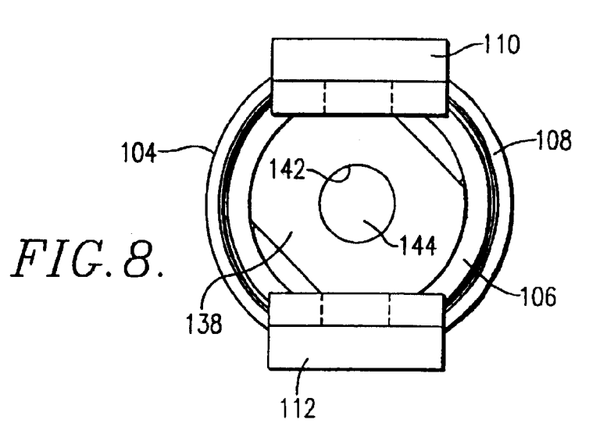
FIG. 8 is an elevational view of the left end of the tow bar shown in FIG. 3.
Figure 9:
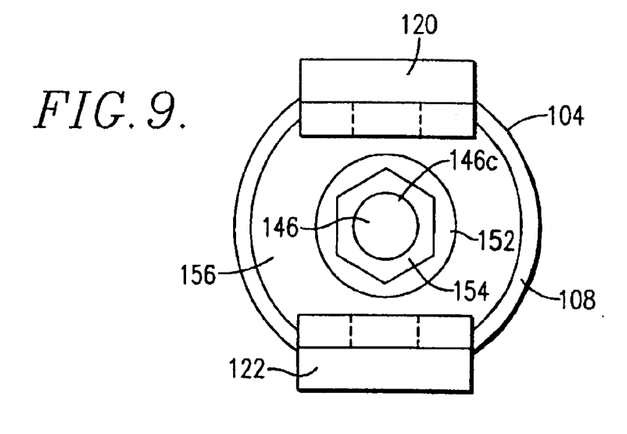
FIG. 9 is an elevational view of the right end of the tow bar shown in FIG. 3.

As perhaps best shown in FIGS. 3–5, the preferred tow bar 104 includes two telescopically interfitted tubular cylinders 106 and 108. The cylinders 106 and 108 are connected to the accumulating and intermediate trolleys 38 and 62 by respective gimble-type attachments that accommodate for grades and turns along the conveyor path. Particularly, the inner cylinder 106 includes a pair of attachment ears 110 and 112 (see also FIG. 8) between which a block 114 is secured by a nut and bolt assembly 116 (see FIG. 1). As is customary, the assembly 116 permits relative pivoting movement between the block 114 and ears 110,112. A nut and bolt assembly 118 similarly attaches the straps 48,50 of the accumulating trolley 38 to the block 114. The assemblies 116 and 118 therefore define relatively perpendicular pivot axes at the attachment point between the tow bar 104 and accumulating trolley 38. Similar to the inner cylinder 106, a pair of attachment ears 120,122 are fixed to the opposite end of the outer cylinder 108. Furthermore, the ears 120,122 are attached to the straps 72 of the intermediate trolley 62 by a relatively pivotable block 124 and nut and bolt assemblies 126 and 128, as shown in FIG. 1.

Movement of the cylinders 106 and 108 is generally limited to shifting along the longitudinal axis of the tow bar 104 (i.e., telescopic extension and retraction of the tow bar) and relative rotation as will subsequently be described. If desired, it may be possible to utilize various other tubular shapes (e.g., a polygonal cross-sectional shape) as an alternative to the illustrated cylindrical shape, particularly when there is no requirement for relative rotation between the ends of the tow bar 104. It is also noted that, because of the preferred tubular nature of the illustrated cylinders 106 and 108, an internal chamber 130 is defined by the tow bar 104. As will subsequently be described, the chamber 130 contains the mechanism that serves to diffuse shock loads between the accumulating trolley 38 and intermediate trolley 162.

Figure 7:
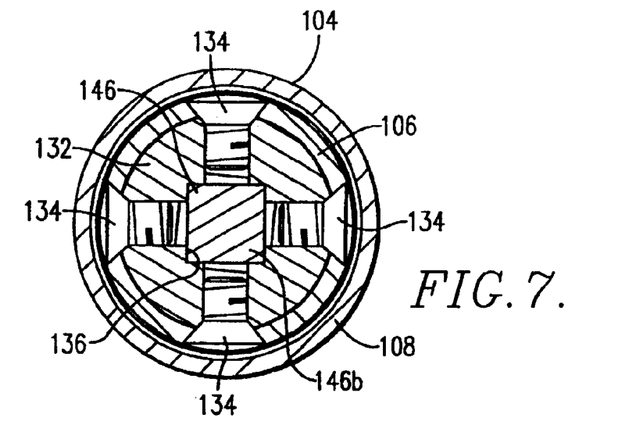
FIG. 7 is a cross-sectional view taken along 7—7 of FIG. 5, particularly illustrating the guide block slidably receiving the externally threaded bar fixed to the outer cylinder.

Turning first to the inner cylinder 106, a guide block 132 is mounted adjacent the concealed end of the cylinder 106. As perhaps best shown in FIG. 7, the guide block 132 is fixed to the cylinder 106 by four screws 134 projecting radially through the cylinder 106 arid into the block 132. The illustrated screws 134 are threadably received within the block 132 and are spaced equally about the circumference of the cylinder 106. For purposes which will be described below, the block 132 presents a central, square-shaped opening 136. A mounting block 138 is similarly mounted to the cylinder 106 adjacent the exposed end thereof. Particularly, the block 138 is fixed in place by four screws 140 (only two of the screws being shown in the drawing figures) which are spaced equally about the circumference of the cylinder 106 and project radially inward through the cylinder 106 and into threaded engagement with the block 138 (see FIGS. 4 and 5). A central opening 142 is defined in the block 138, and a bar 144 is fixed in the opening 142 by suitable means (e.g., welding, press fit, adhesive, threaded interengagement). As perhaps best shown in FIG. 8, the bar 144 has a circular cross-sectional shape and is positioned by the block 138 in axial alignment with the cylinder 106. The bar 144 includes an externally threaded section 144a that projects inwardly from the distal end of the bar 144. It is also noted that the illustrated screws 140 terminate short of the bar 144 and therefore do not serve to attach the bar 144 to the block 138 and cylinder 106, although the use of screws providing such attachment is entirely within the ambit of the present invention.

The outer cylinder 108 is also associated with a concentric bar 146 that similarly includes an innermost, externally threaded section 146a (see FIGS. 4 and 5). However, contrary to the bar 144, the bar 146 has a square-shaped central section 146b slidably received within the opening 136 of the guide block 132. In addition, adjacent the end of the bar 144 opposite from the externally threaded section 146a is a cylindrical outermost section 146c having standard screw threads defined partly along the length thereof. The cylindrical section 146c has a relatively smaller cross-sectional shape than the square-shaped section 146b, such that a shoulder is defined at the transition of these sections. A bushing 148 is received on the cylindrical section 146c between a pair of washers 150 and 152. These components (i.e., the bushing 148 and the washers 150,152) are secured against the shoulder by a nut 154 screwed onto the section 146c. A disk 156 is positioned between the washers 150 and 152 and is fixed to the inside of the outer cylinder 108. The foregoing arrangement prevents the bar 146 from shifting axially relative to the cylinder 108 but permits relative rotational movement between the bar 146 and cylinder 108. However, the corresponding polygonal shape of the bar 146 and opening 136 in the guide block 132 prevents relative rotational movement between the bar 146 and guide block 132. In this respect, the bar 146 is rotationally fixed relative to the cylinder 106, although the cylinders 106 and 108 are permitted to rotate relative to one another. A stop 158, preferably in the form of a circular washer having a square-shaped central opening, is fixed by suitable means (e.g., welding) to the central section 146b of the bar 146. The washer 150 and the stop 158 are positioned at relatively stationary locations on opposite sides of the guide block 132 and are configured for abutting interengagement with the block 132 (see FIGS. 5 and 4, respectively). In this respect, the washer 150 and stop 158 serve to limit relative sliding movement between the bar 146 and guide block 132. Because the guide block 132 and bar 146 are prevented from shifting axially relative to the respective cylinders 106 and 108, the stop washers 150,158 and guide block 132 also limit relative axial shifting of the cylinders 106 and 108. That is to say, the interengagement of the guide block 132 and washer 150 limits retraction of the tow bar 104 (see FIG. 5), while interengagement of the guide block 132 and washer 158 limits extension of the tow bar 104 (see FIG. 4). As shown in FIG. 5, the tow bar 104 is arranged so that the bars 144 and 146 do not contact one another when the tow bar is fully retracted.

As noted, the bars 144 and 146 shift relative to one another during corresponding shifting of the cylinders 106 and 108. Moreover, the bars 144 and 146 are coaxial so that the externally threaded sections 144a and 146a are located on a common thread axis along which relative shifting of the bars occurs. The axial alignment of the bars 144 and 146 is facilitated by the fact that both bars are directly coupled to the same cylinder 106 by the respective blocks 138 and 132. The bars 144 and 146 have a common thread pitch, although the threads are oppositely inclined (i.e., the bar 144 is provided with a left-handed thread and the bar 146 is provided with a right-handed thread). It is also noted that the threads of both bars 144 and 146 are a so-called "parallel screw thread". It may be said that the threaded sections 144a and 146a are essentially mirror images of one another.

The tow bar 104 further includes a cylindrical-shaped, internally threaded spool 160 that threadably receives the threaded sections 144a and 146a of the bars 144 and 146. The internal face of the spool 160 is provided with oppositely inclined threaded sections 160a and 160b for threadably engaging the respective bar sections 144a and 146a. The spool 160 is consequently disposed along the same thread axis as the bars 144 and 146 and has internal threads with the same pitch as the threads of the bars 144,146. Thus, when the bars 144 and 146 shift relative to one another along the thread axis, the spool is required to rotate relative to the bars. Particularly, when the tow bar 104 is retracted (e.g., the cylinders 106 and 108 move toward one another), the spool 160 progressively screws onto the threaded sections 144a and 146a. On the other hand, when the tow bar 104 is extended, the spool 160 progressively unscrews along the threaded sections 144a and 146a. The opposite inclination of the threads, as noted above, provides the simultaneous screwing or unscrewing action of the spool 160 relative to the threaded sections 144a and 146a. It is noted that the spool 160 is of sufficient length to avoid disconnection from the bars 144 and 146 when the tow bar 104 is fully extended (see FIG. 4).

Moreover, the spool 160 serves to check relative axial movement of the cylinders 106 and 108. That is to say, the tow bar 104 is not freely extendable and retractable, but rather relative axial shifting of the cylinders 106 and 108 requires spinning of the spool 160 and thereby a screwing or unscrewing action cooperatively presented by the bars 144, 146 and spool 160. This action absorbs energy and consequently diffuses any forces that might cause the tow bar 104 to extend or retract. Moreover, the absorbed energy is not stored by the tow bar 104. In other words, the coaction of the bars 144,146 and spool 160 do not create a reactionary force to that exerted on the tow bar 104. For example, when a load causes retraction of the tow bar 104, there will not be stored energy that causes extension of the tow bar 104 once the load has been diffused or stopped.

The bars 144,146 and spool 160 are preferably machined from a high strength steel material. The remaining previously-described components of the tow bar 104 are also preferably formed of metal, although high strength steel may not be required. Standard fabrication techniques are preferably used to form these components (e.g., the cylinders 106 and 108 are preferably cast). A suitable thread arrangement for the bars 144,146 and spool 160 is a thread having an angle of 45°, a pitch corresponding to one complete thread turn for every 1⅞ inches along the thread axis, and an approximately 5/16 inch square cross-sectional shape. It has been determined that a tow bar having such a thread arrangement is capable of absorbing the loads generated by items weighing as much as 12,500 lbs.

Figure 6:
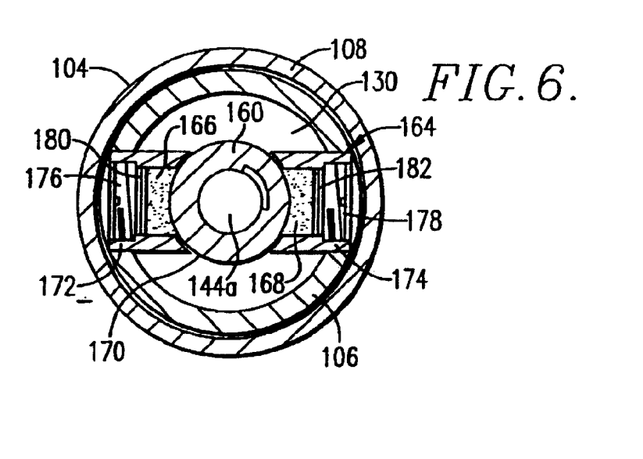
FIG. 6 is a cross-sectional view taken along 6—6 of FIG. 3, particularly illustrating the construction of the brake mechanism.

The tow bar 104 is preferably provided with means for permitting adjustment of the resistance to tow bar extension and retraction. As indicated above, such adjustment permits the tow bar 104 to be used in various load applications. For example, the resistance to tow bar extension and retraction is increased when a relatively heavy load is carried on the support table 96. On the other hand, the resistance can be decreased when a relatively lighter load is carried on the table 96. In the illustrated embodiment, the tow bar 104 is provided with a brake mechanism 164 configured to adjustably restrain rotation of the spool 160. As perhaps best shown in FIG. 6, the brake mechanism 164 includes a pair of pads 166 and 168 which are yieldably pressed against the cylindrical outer surface 170 of the spool 160. The pads are preferably formed of a material similar to that used in automotive brake pads 166 and 168 (e.g., an asbestos material), although other suitable materials may be used. The pads 166 and 168 are prevented from rotating with the spool 160 as a result of being contained within respective sleeves 172 and 174. The sleeves 172 and 174 project through the wall of the inner cylinder 106 and are positioned in such a manner that the pads 166 and 168 are urged against the spool 160 at diametrically opposite locations. It will be appreciated that this reduces the risk of shifting the spool 160 off the thread axis which might lock or, at the very least, unduly restrict extension and retraction of the tow bar 104. Threaded caps 176 and 178 are provided in the respective sleeves 172 and 174, as well as spring washers 180 and 182. Inward screwing of the caps 176 and 178 cause the pads 166 and 168 to exert greater forces against the spool 160, while unscrewing of the caps 176 and 178 relieves the forces exerted against the spool 160 by the pads 166 and 168. In other words, inward screwing of the caps 176 and 178 provides greater resistance to spool rotation and the tow bar 104 is consequently capable of absorbing relatively greater loads. On the other hand, unscrewing of the caps 176 and 178 provides less resistance to spool rotation and the tow bar 104 can only absorb relatively smaller loads.

The operation of the illustrated conveyor system should be apparent from the foregoing description. Thus, it shall be sufficient to explain that a load is supported on the table 96 and moved along the conveyor path while the stop mechanism 52 is in the engaged position. However, when the mechanism 52 is swung to the disengaged position and held against further forward movement (which causes simultaneous sudden stopping of the accumulating trolley 38), the momentum of the load carriage 40 and the item(s) supported thereon is absorbed as the tow bar 104 retracts. None of the absorbed energy is stored, and the tow bar 104 consequently does not cause the carrier 36 to lunge forwardly once the restraint against forward stop mechanism movement is removed. In addition, when the stop mechanism 52 is engaged by one of the pusher dogs 26, the tow bar 104 slowly extends and the carriage 40 is gradually accelerated to the speed of the accumulating trolley 38. Ideally, the tow bar 104 will extend to the fully extended position shown in FIG. 4, such that the full stroke of the tow bar 104 will be available to absorb the energy generated the next time the carrier 36 is suddenly stopped.

The preferred forms of the invention described above are to be used as illustration only, and should not be utilized in a limiting sense in interpreting the scope of the present invention. Obvious modifications to the exemplary embodiments, as hereinset forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A shock absorbing device for cushioning relative movement of two structures, said shock absorbing device extending between the two structures in an impact direction, said device comprising:
    a first component connectable to one of the structures;
    a second component including a braking surface that translates in the impact direction during cushioning movements;
    a third component connectable to the other one of the structures,
        said first component telescopically received for longitudinal movement in the third component during cushioning movements,
        said second component positioned at least partly in the first component; and
    a brake fixed to the first component and frictionally engaging the braking surface to hereby restrict translational movements of the second component relative to the first component during relative movements of the first and third components during cushioning movements.

2. A shock absorbing device as claimed in claim 1, said brake at least partially disposed in the first component.

3. A shock absorbing device as claimed in claim 1, said second component at least partially disposed in the first and third components.

4. A shock absorbing device as claimed in claim 3, said second component coupled to the third component.

5. A shock absorbing device as claimed in claim 3, said brake at least partially disposed in the first and third components.

6. A shock absorbing device as claimed in claim 5, said brake being adjustable to vary the frictional force between the brake and the braking surface.

7. A shock absorbing tow bar for interconnecting a drive unit and a load-support unit of a conveyor system, said shock absorbing tow bar extending between the drive unit and tile load-supporting unit in an impact direction, said tow bar comprising:
    a first component connectable to one of the units;
    a second component including a braking surface that translates in the impact direction during cushioning movements; and
    a third component connectable to the other one of the units,
        said first component telescopically received for longitudinal movement in the third component during cushioning movements,
        said second component positioned at least partly in the first component; and
    a brake fixed to the first component and frictionally engaging the braking surface to thereby restrict translational movements of the second component relative to the first component during relative movements of the first and third components during cushioning movements.

8. A tow bar as claimed in claim 7, said brake at least partially disposed in the first component.

9. A tow bar as claimed in claim 7, said second component at least partially in the first and third components.

10. A tow bar as claimed in claim 9, said second component coupled to the third component.

11. A tow bar as claimed in claim 9, said brake at least partially disposed in the first and third components.

12. A tow bar as claimed in claim 11, said brake being adjustable to vary the frictional force between the brake and the braking surface.

13. A load carrier for a conveyor system, said load carrier comprising:
    a drive unit;
    a load-supporting unit in trailing relationship with the drive unit; and
    a shock absorbing tow bar for connecting the load-supporting unit to the drive unit, said shock absorbing tow bar extending between the load-supporting unit and the drive unit in an impact direction, said tow bar including
        a first component connected to one of the units,
    a second component including a braking surface that translates in the impact direction during cushioning movements;
    a third component connectable to the other one of the units;
        said first component telescopically received for longitudinal movement in the third component during cushioning movements,
        said second component positioned at least partly in the first component; and
    a brake fixed to the first component and frictionally engaging the braking surface to thereby restrict translational movements of the second component relative to the first component during relative movements of the first and third components during cushioning movements.

14. A load carrier as claimed in claim 13, said brake at least partially disposed in the first component.

15. A load carrier as claimed in claim 13, said second component at least partially disposed in the first and third components.

16. A load carrier as claimed in claim 15, said second component coupled to the third component.

17. A load carrier as claimed in claim 15, said brake at least partially disposed in the first and third components.

18. A load carrier as claimed in claim 17, said brake being adjustable to vary the frictional force between the brake and the braking surface.

19. A shock absorbing device for cushioning relative movement between two structures, said device comprising:
    a first component connectable to one of the structures;
    a second component including a bring surface that moves relative to the first component along the longitudinal axis of the device when the two structures move relative to one another;
    a third component connectable to the other one of the structures, said first component telescopically received for longitudinal movement in the third component during cushioning movements, said second component positioned at least party in the first component; and a brake fixed to the first component and frictionally engaging the braking surface for restricting translational movements of the second component during relative movements of the first and third components during cushioning movements, said brake being adjustable so that the magnitude of the frictional engagement force between the brake and the braking surface can be varied.

20. A shock absorbing device as claimed in claim 19, said brake including a sleeve coupled to the first component and a cap threadably engaging the sleeve so that rotation of the cap relative to the sleeve causes translation of the cap relative to the sleeve.

21. A shock absorbing device as claimed in claim 20, said brake including a brake pad at least partially disposed within the sleeve for frictionally engaging the braking surface.

22. A shock absorbing device as claimed in claim 21, said brake including a cushioning element interposed between the cap and the brake pad.

23. A shock absorbing device as claimed in claim 22, said cushioning element being a spring washer.

24. A shock absorbing device as claimed in claim 19, said second component and said brake at least partially disposed in the third component.

25. A shock absorbing device for interconnecting a drive unit and a load-supporting unit of a conveyor system, said tow bar comprising:

a first component connectable to one of the units;

a second component including a braking surface that moves relative to the first component along the longitudinal axis of the device when the two units move relative to one another;

a third component connectable to the other one of the units, said first component telescopically received for longitudinal movement in the third component during cushioning movements, said second component positioned at least partly in the first component; and a brake fixed to the first component and frictionally engaging the braking surface for restricting translational movements of the second component during relative movements of the first and third components during cushioning movements, said brake being adjustable so that the magnitude of the frictional engagement force between the brake and the braking surface can be varied.

26. A tow bar as claimed in claim 25, said brake including a sleeve coupled to the first component and a cap threadably engaging the sleeve so that rotation of the cap relative to the sleeve causes translation of the cap relative to the sleeve.

27. A tow bar as claimed in claim 26, said brake including a brake pad at least partially disposed within the sleeve for frictionally engaging the braking surface.

28. A tow bar as claimed in claim 27, said brake including a cushioning element interposed between the cap and the brake pad.

29. A tow bar as claimed in claim 28, said cushioning element being a spring washer.

30. A tow bar as claimed in claim 25, said second component at least partially disposed within the first component.

31. A load carrier for a conveyor system, said load carrier comprising:

a drive unit;

a load-supporting unit in trailing relationship with the drive unit; and a shock absorbing tow bar for connecting the load-supporting unit to the drive unit, said tow bar including a first component connected to one of the units;

a second component including a braking surface that moves relative to the first component along the longitudinal axis of the device when the two units move relative to one another;

a third component connectable to the other one of the units, said first component telescopically received for longitudinal movement in the third component during cushioning movements, said second component positioned at least partly in the first component; and a brake fixed to the first component and frictionally engaging the braking surface for restricting translational movements of the second component during relative movements of the first and third components during cushioning movements, said brake being adjustable so that the magnitude of the frictional engagement force between the brake and the braking surface can be varied.

32. A load carrier as claimed in claim 31, said brake including a sleeve coupled to the first component and a cap threadably engaging the sleeve so that rotation of the cap relative to the sleeve causes translation of the cap relative to the sleeve.

33. A load carrier as claimed in claim 32, said brake including a brake pad at least partially disposed within the sleeve for frictionally engaging the braking surface.

34. A load carrier as claimed in claim 33, said brake including a cushioning element interposed between the cap and the brake pad.

35. A load carrier as claimed in claim 34, said cushioning element being a spring washer.

36. A load carrier as claimed in claim 31, said second component and said brake at least partially disposed in the third component.

37. A shock absorbing device for cushioning relative movement between two structures, said device comprising:

a first component connectable to one of the structures and including a first sleeve;

a second component connectable to the other of the structures and including a second sleeve, said first and second sleeves being telescopically interfitted;

a third component including a braking surface which shifts along a longitudinal axis of the device and relative to the first component when the first and second components are shifted relative to one another during cushioning movements; and a brake fixed to the first component and frictionally engaging the braking surface to thereby restrict shifting of the third component relative to the first component during cushioning movements.

38. A shock absorbing device as claimed in claim 37, said first sleeve being telescopically received in the second sleeve.

39. A shock absorbing device as claimed in claim 38, said third component at least partially disposed in the first and second sleeves.

40. A shock absorbing device as claimed in claim 39, said third component being coupled to the second component.

41. A shock absorbing device as claimed in claim 40, said brake being fixedly coupled to the first sleeve.

42. A shock absorbing device as claimed in claim 41, said brake being adjustable to vary the frictional force between the brake and the braking surface.

43. A shock absorbing tow bar for interconnecting a drive unit and a load-supporting caret of a conveyor system, said tow bar comprising:
- a first component connectable to one of the units and including a first sleeve;
- a second component connectable to the other of the units and including a second sleeve,
  - said first and second sleeves being telescopically interfitted;
- a third component including a braking surface which shifts along a longitudinal axis of the device and relative to the first component when the first and second components are shifted relative to one another during cushioning movements; and
- a brake fixed to the first component and frictionally engaging the braking surface to thereby restrict shifting of the third component relative to the first component during cushioning movements.

44. A tow bar as claimed in claim 43, said first sleeve being telescopically received in the second sleeve.

45. A tow bar as claimed in claim 44, said third component at least partially disposed in the first and second sleeves.

46. A tow bar as claimed in claim 45, said third component being coupled to the second component.

47. A low bar as claimed in claim 46, said brake being fixedly coupled to the first sleeve.

48. A tow bar as claimed in claim 47, said brake being adjustable to vary the frictional force between the brake and the braking surface.

49. A load carrier for a conveyor system, said load carrier comprising:
- a drive unit;
- a load-supporting unit in trailing relationship with the drive unit; and
- a shock absorbing tow bar for connecting the load-supporting unit to the drive unit, said tow bar including
  - a first component connected to one of the units and including a first sleeve;
  - a second component connected to the other of the units and including a second sleeve,
    - said first and second sleeves being telescopically interfitted;
  - a third component including a braking surface which shifts along a longitudinal axis of the device and relative to the first component when the first and second components are shifted relative, to one another during cushioning movements; and
  - a brake fixed to the first component and frictionally engaging the braking surface to thereby restrict shifting of the third component relative to the first component during cushioning movements.

50. A load carrier as claimed in claim 49, said first sleeve being telescopically received in a second sleeve.

51. A load carrier as claimed in claim 50, a third component at least partially disposed in the first and second sleeves.

52. A load carrier as claimed in claim 51, said third component being coupled to the second component.

53. A load carrier as claimed in claim 52, said brake being fixedly coupled to the first sleeve.

54. A load carrier as claimed in claim 53, said brake being adjustable to vary the frictional force between the brake and the braking surface.

* * * * *

UNITED STATES PATENT AND TRADEMARK OFFICE
CERTIFICATE OF CORRECTION

PATENT NO. : 6,330,952 B2
DATED : December 18, 2001
INVENTOR(S) : Summa, Gareth D. et al.

It is certified that error appears in the above-identified patent and that said Letters Patent is hereby corrected as shown below:

Column 2,
Line 29, insert -- is -- between "invention" and "to"
Line 41, replace the period between "load" and "supporting" with a hyphen Column 4,
Line 28, remove the period between "shown)" and "is"

Column 6,
Line 11, replace "arid" with -- and --

Column 9,
Line 36, replace "hereby" with -- thereby --
Line 54, replace "load-support" with -- load-supporting --
Line 57, replace "tile" with -- the --

Column 10,
Line 12, insert -- disposed -- between "partially" and "in"
Line 62, replace "bring" with -- braking --

Column 11,
Line 4, replace "party" with -- partly --

Column 13,
Line 9, replace "caret" with -- unit --
Line 34, replace "low" with -- tow --

UNITED STATES PATENT AND TRADEMARK OFFICE
CERTIFICATE OF CORRECTION

PATENT NO. : 6,330,952 B2
DATED : December 18, 2001
INVENTOR(S) : Summa, Gareth D. et al.

It is certified that error appears in the above-identified patent and that said Letters Patent is hereby corrected as shown below:

Column 14,
Line 18, remove the comma between "relative" and "to"

Signed and Sealed this

Fifteenth Day of October, 2002

*Attest:*

JAMES E. ROGAN
*Attesting Officer*     *Director of the United States Patent and Trademark Office*